United States Patent
Chen et al.

(10) Patent No.: US 11,064,021 B2
(45) Date of Patent: Jul. 13, 2021

(54) METHOD, DEVICE AND COMPUTER PROGRAM PRODUCT FOR MANAGING NETWORK SYSTEM

(71) Applicant: EMC IP Holding Company LLC, Hopkinton, MA (US)

(72) Inventors: Fei Chen, Beijing (CN); Fucai Liu, Beijing (CN); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 16/403,175

(22) Filed: May 3, 2019

(65) Prior Publication Data
US 2019/0387051 A1    Dec. 19, 2019

(30) Foreign Application Priority Data
Jun. 15, 2018 (CN) .......................... 201810621512.8

(51) Int. Cl.
*H04L 29/08* (2006.01)
*H04L 12/803* (2013.01)

(52) U.S. Cl.
CPC ........ *H04L 67/1014* (2013.01); *H04L 47/125* (2013.01); *H04L 67/327* (2013.01)

(58) Field of Classification Search
CPC . H04L 67/1014; H04L 47/125; H04L 67/327; H04L 69/22; G06F 9/505
See application file for complete search history.

(56) References Cited

U.S. PATENT DOCUMENTS

| | | | |
|---|---|---|---|
| 2004/0117438 A1* | 6/2004 | Considine | H04L 67/1097 709/203 |
| 2007/0005786 A1* | 1/2007 | Kumar | H04L 45/563 709/230 |
| 2007/0005801 A1* | 1/2007 | Kumar | H04L 63/08 709/238 |
| 2015/0003235 A1* | 1/2015 | Cho | H04W 28/06 370/229 |
| 2015/0281195 A1* | 10/2015 | Sharma | H04L 9/3242 713/151 |

(Continued)

*Primary Examiner* — Davoud A Zand
(74) *Attorney, Agent, or Firm* — Ryan, Mason & Lewis, LLP (57) ABSTRACT

Techniques for managing a network system are disclosed. For example, a method comprises: receiving, at a network adapter, an access request from a client, the access request including first header information and first payload information; transmitting the first header information to a load balancing server associated with the network adapter; receiving the updated first header information from the load balancing server, wherein the updated first header information is determined by the load balancing server based on the received first header information and an identifier of the load balancing server, and wherein the updated first header information indicates a destination server to which the access request is to be transmitted; and, generating, based on the updated first header information and the first payload information, an updated access request. Accordingly, the processing capability of load balancing servers and the performance of load balancing servers in a network system may be improved effectively.

20 Claims, 6 Drawing Sheets

(56) References Cited

U.S. PATENT DOCUMENTS

| | | | |
|---|---|---|---|
| 2015/0281196 A1* | 10/2015 | Sharma | H04L 51/12 713/151 |
| 2015/0281199 A1* | 10/2015 | Sharma | H04L 63/08 713/168 |
| 2015/0281213 A1* | 10/2015 | Sharma | H04L 63/083 726/9 |
| 2015/0281241 A1* | 10/2015 | Sharma | H04L 63/10 726/9 |
| 2015/0281254 A1* | 10/2015 | Sharma | H04L 63/0876 726/4 |
| 2015/0326539 A1* | 11/2015 | Sharma | H04L 9/0838 713/168 |
| 2016/0294946 A1* | 10/2016 | Williams | H04L 63/164 |
| 2017/0093616 A1* | 3/2017 | Yan | H04L 41/082 |
| 2017/0295503 A1* | 10/2017 | Govindaraju | H04W 4/38 |
| 2018/0183723 A1* | 6/2018 | Cariou | H04L 12/4633 |
| 2018/0278725 A1* | 9/2018 | Thayer | H04L 67/2804 |
| 2018/0294993 A1* | 10/2018 | Poulin | H04L 47/825 |

* cited by examiner

METHOD, DEVICE AND COMPUTER PROGRAM PRODUCT FOR MANAGING NETWORK SYSTEM

RELATED APPLICATION(S)

The present application claims priority to Chinese Patent Application No. 201810621512.8, filed Jun. 15, 2018, and entitled "Method, Device and Computer Program Product for Managing Network System," which is incorporated by reference herein in its entirety.

FIELD

The present disclosure generally relates to the network communication, and more specifically, to a method, a device and a computer program product for managing a network system.

BACKGROUND

With the growth of network technology, current web servers often need to face and deal with a large number of access requests and huge data traffic in an instant. The data processing capability and data throughput of a single server are far from satisfying the demands in practical use. A large commercial website normally uses a data center consisting of a large number of (e.g., thousands of) application servers in the backend to simultaneously serve millions of clients, so as to satisfy the demand for high throughput at the same moment.

In order to provide unified access entry for users as well as to balance the loads on all application servers in the backend, a load balancing mechanism is required. In such a mechanism, one or more load balancing servers act as proxies and equally distribute network requests from all users to all the application servers inside the data center with their own load balancing algorithms. These application servers process these network requests, and return responses to these network requests to the load balancing servers and further to the corresponding users. Such load balancing servers are usually faced with huge demands for data processing. Therefore, the question of how to perform a load balancing operation and improve the performance of the load balancing servers more efficiently has become an important issue.

SUMMARY

Embodiments of the present disclosure provide a method, a device and a computer program product for managing a network system.

In accordance with a first aspect of the present disclosure, there is provided a method of managing a network system comprising: receiving, at a network adapter, an access request from a client, the access request including first header information and first payload information; transmitting the first header information to a load balancing server associated with the network adapter; receiving the updated first header information from the load balancing server, wherein the updated first header information is determined by the load balancing server based on the received first header information and an identifier of the load balancing server, and wherein the updated first header information indicates a destination server to which the access request is to be transmitted; and, generating, based on the updated first header information and the first payload information, an updated access request.

In accordance with a second aspect of the present disclosure, there is provided a method of managing a network system, comprising: receiving, from a network adapter, first header information in an access request from a client; updating the first header information based on the received first header information and an identifier of the load balancing server associated with the network adapter, the updated first header information indicating a destination server to which the access request is to be transmitted; and, transmitting the updated first header information to the network adapter such that the network adapter generates an updated access request based on the updated first header information and first payload information in the access request.

In accordance with a third aspect of the present disclosure, there is provided device of managing a network system, comprising: one or more processors; a memory coupled to at least one of the one or more processers; and, computer program instructions stored in the memory that, when executed by the at least one processor, cause the device to execute acts, the acts comprising: receiving, at a network adapter, an access request from a client, the access request including first header information and first payload information; transmitting the first header information to a load balancing server associated with the network adapter; receiving the updated first header information from the load balancing server, wherein the updated first header information is determined by the load balancing server based on the received first header information and an identifier of the load balancing server, and wherein the updated first header information indicates a destination server to which the access request is to be transmitted; and, generating, based on the updated first header information and the first payload information, an updated access request.

In accordance with a fourth aspect of the present disclosure, there is provided device of managing a network system, comprising: one or more processors; a memory coupled to at least one of the one or more processors; and, computer program instructions stored in the memory that, when executed by the at least one processor, cause the device to execute acts, the acts comprising: receiving, from a network adapter, first header information in an access request from a client; updating the first header information based on the received first header information and an identifier of the load balancing server associated with the network adapter, the updated first header information indicating a destination server to which the access request is to be transmitted; and, transmitting the updated first header information to the network adapter such that the network adapter generates an updated access request based on the updated first header information and first payload information in the access request.

In accordance with a fifth aspect of the present disclosure, there is provided a computer program product. The computer program product is tangibly stored in a computer-readable medium and comprises machine-executable instructions that, when executed, cause a machine to execute the method in accordance with the first aspect of the present disclosure.

In accordance with a sixth aspect of the present disclosure, there is provided a computer program product. The computer program product is tangibly stored in a computer-readable medium and comprises machine-executable instructions that, when executed, cause a machine to execute the method in accordance with the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of example implementations of the present disclosure will become more apparent, through detailed description on example implementations of the present disclosure with reference to the accompanying drawings, in which like reference numbers generally represent like components.

DETAILED DESCRIPTION

Preferred embodiments of the present disclosure will be described hereinafter in more detail with reference to the drawings. It should be appreciated that although the drawings illustrate preferred embodiments of the present disclosure, the present disclosure may be implemented in various manners and should not be limited to the embodiments as described herein. Rather, these embodiments are provided to make the present disclosure more thoroughly and completely, and to fully convey the scope of the present disclosure to those of ordinary skill in the art.

As used herein, the term "include" and its variants are to be read as open-ended terms that mean "includes, but not limited to." The term "or" is to be read as "and/or" unless the context clearly indicates otherwise. The term "based on" is to be read as "based at least partially on." The term "an example embodiment" and "an embodiment" are to be read as "at least one example embodiment." The term "another embodiment" is to be read as "at least one further embodiment" The term "first," "second" or the like may indicate the different or the same objects. Other explicit or implicit definitions may be included hereinafter.

Conventionally, a load balancing server at an entry of a data center can receive access requests from a plurality of external clients and then forward those access requests to a plurality of application servers in the backend. The operations executed by this load balancing server will be described hereinafter with reference to the network architecture 100 as illustrated in FIG. 1.

Figure 1:
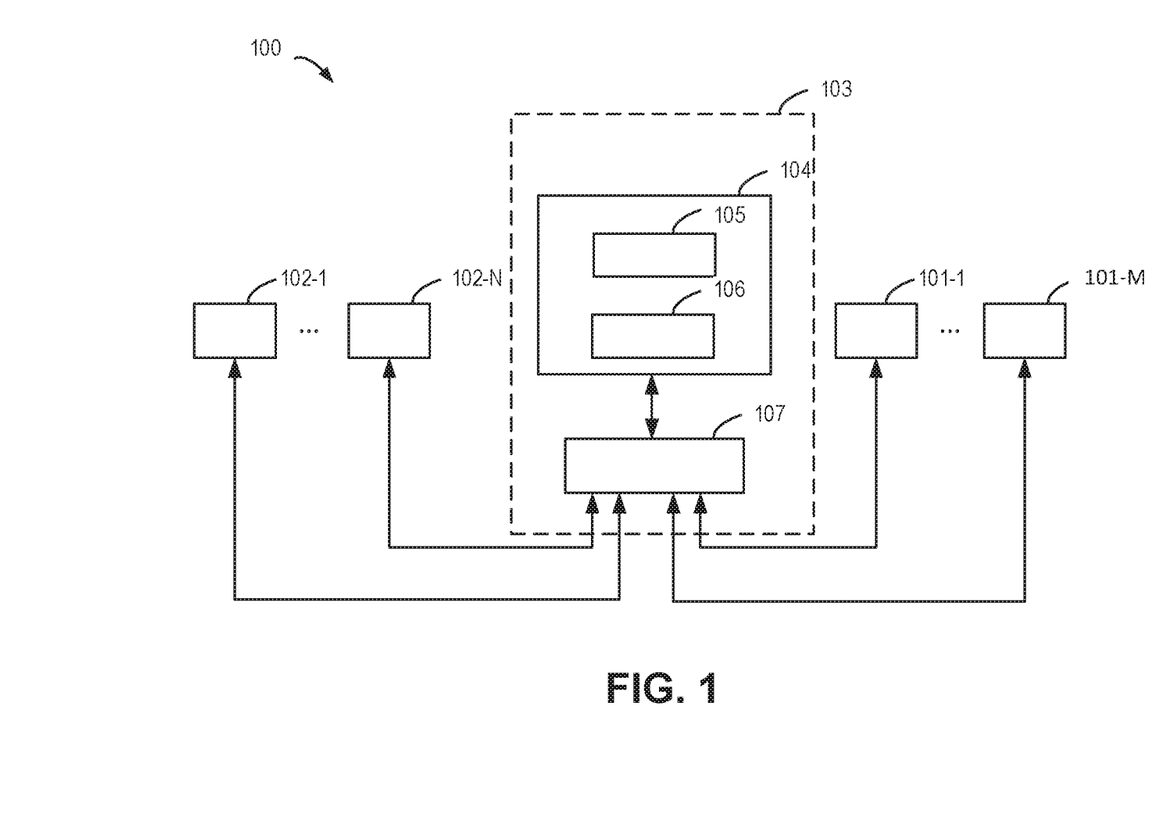
FIG. 1 illustrates a schematic diagram of a network architecture for executing a load balancing operation according to a conventional solution.

FIG. 1 illustrates a schematic diagram of network architecture 100 for executing a load balancing operation according to a conventional solution. The network architecture 100 may include one or more clients, including a client 101-1 . . . a client 101-M (collectively or separately referred to as client 101, wherein M represents a natural number). The network architecture 100 further comprises one or more application servers in the backend, including an application server 102-1 . . . an application server 102-N (collectively or separately referred to as application server 102, wherein N represents a natural number). The network architecture 100 further comprises a network system 103. Inside the network system 103, there is hardware called a network adaptor (also known as a Network Interface Card, hereinafter referred to as NIC) 107 and a host CPU 104. Each client 101 communicates with the network system 103 at the entry of the website data center independently, transmits an access request to the network system 103, and receives a response to the access request via the network system 103. It should be understood that, even though only one network system is illustrated in FIG. 1, there may be a plurality of network systems for executing load balancing operations. The present disclosure is not limited to this example.

The network system 103 executes a load balancing operation. Specifically, the network adaptor NIC 107 inside the network system 103 unitedly receives access requests from a plurality of clients and then transmits those access requests to the host CPU 104. A software module 105 for executing a load balancing operation and a Transmission Control Protocol/Internet Protocol (TCP/IP) protocol stack 106 run in the host CPU 104. It should be readily appreciated that the host CPU 104 actually operates as a load balancing server. In the following description, the "host CPU 104" can be used interchangeably with the "load balancing server 104". The load balancing software 105 inside the host CPU 104 processes the received access requests, matches each access request with one of the plurality of application servers 102 by a preset load balancing algorithm, and forwards this access request to the matched application server 102.

For example, the NIC 107 receives an access request from the client 101-1, which access request generally includes identifier information for uniquely identifying this access request. For example, the identifier information may specifically include the address of the client 101-1 from which the access request comes, and the identifier (ID) of the access request. In this way, the access request may be referred to as Req(Client_addr,IDx). The NIC 107 transmits the received access request Req to the host CPU 104, and the access request Req is processed by the load balancing software module 105. During this process, the load balancing software module 105 determines an application server 102 to which this access request is to be forwarded for this access request based on the preset load balancing algorithm. The load balancing software module further modifies the identifier information of the access request as Req(LB_addr, IDy), where LB_addr is the address information of the load balancing server 104. The access request is then fed and forwarded to the matched application server 102. A mapping relation (LB_addr<->Client_addr) between the identifier information before modification and the identifier information after modification is also stored in the load balancing server 104.

The application server 102 processes this access request and returns a response back to the host CPU 104. The response can be referred to as Rsp(LB_addr,IDy). Based on the way of processing similar to an access request, the NIC 107 receives the response and transmits the response to the load balancing server 104. The load balancing server 104 determines, based on the mapping relation determined and stored previously and on the LB_addr information, the corresponding client_addr so as to determine the address of the client 101-1 to which the response is to be forwarded, and then forwards the response to the client 101-1 via the NIC 107. In this way, one complete cycle of the access processing flow can be realized.

In accordance with the common Ethernet protocol, the access request and the response received by the NIC 107 generally contains two parts, i.e., header and payload. The header generally contains information about a source, a destination, a port, a size of payload data etc. of the access request or response. The payload generally represents data of practical significance contained in the access request and the response, for example, uploaded or downloaded files, pages, pictures or other data.

For the conventional NIC 107, upon receiving these access requests or responses, it is merely transmitted to the load balancing server for processing, regardless of the contents of the access requests or responses. With the continuous increase of concurrent visits from network users, a major existing problem is that the amount of data needed to be forwarded by the NIC 107 is increasing (especially in the case where a payload in the access requests and responses is heavy). Since all data in all access requests and responses need to be transmitted to the host CPU 104 in the network system 103 for load balancing, this would significantly take up the processing time of CPU. In this way, as the throughput of the network system 103 gradually becomes saturated, the performance of the entire network system 103 will be affected.

In view of the deficiencies of the conventional load balancing technology mentioned above, it is desirable to develop a technical solution which may further improve the efficiency of the execution of load balancing operations by the network system 103 as well as the internal performance of the network system 103. In accordance with some embodiments of the present disclosure, there is provided a method of managing a network system. More details of the method of managing a network system and the network architecture 200 will be described hereinafter with reference to FIG. 2.

Figure 2:
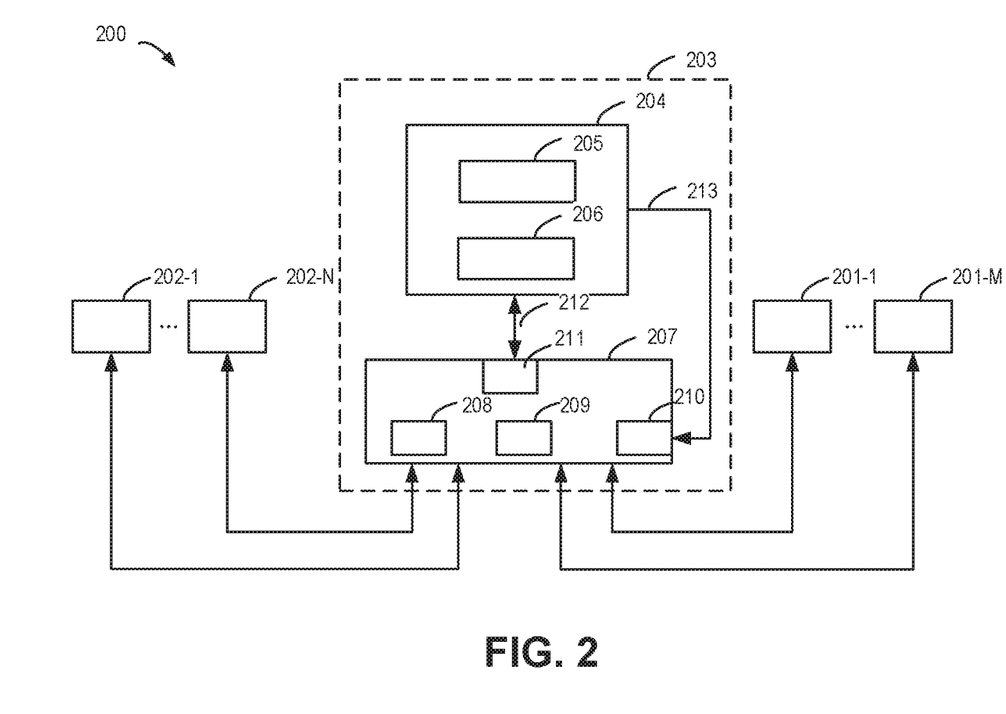
FIG. 2 illustrates a schematic diagram of a network architecture in which embodiments of the present disclosure may be implemented.

FIG. 2 illustrates a schematic diagram of network architecture 200 in which embodiments of the present disclosure can be implemented. Similar to FIG. 1, the network architecture 200 may include one or more clients, including a client 201-1 . . . a client 201-M (collectively or separately referred to as client 201, wherein M represents a natural number). The network architecture 200 further comprises one or more application servers in the backend, including an application server 202-1 . . . an application server 202-N (collectively or separately referred to as application servers 202, wherein N represents a natural number). The network architecture 200 further comprises a network system 203. Inside the network system 203, there is an NIC 207 and a host CPU 204. A software module 205 for executing a load balancing operation and a TCP/IP protocol stack 206 run in the host CPU 204. It should be readily appreciated that the host CPU 204 actually operates as a load balancing server. In the following description, the "host CPU 204" can be used interchangeably with the "load balancing server 204".

Similar to the process of the load balancing operation described with reference to FIG. 1, each client 201 independently communicates with the network system 203 at the entry of the website data center, transmits an access request to the network system 203, and receives a response to the access request via the network system 203. It should be understood that, although only one network system 203 is illustrated in FIG. 2, there may be a plurality of network systems for executing load balancing operations. The present disclosure is not limited to this example.

Different from the NIC 107 illustrated in FIG. 1, the NIC 207 illustrated in FIG. 2 is novel network adapter (also referred to as a smart NIC). Such a network adapter can forward or receive network packets to or from an X86 host. More importantly, it has a certain processing capability and may execute an algorithm/software which is preset in the NIC by a user. Before packets are directly transmitted to the X86 host for processing, such a smart NIC allows a user to perform some control and computation functions on these packets, so that the operation of the whole network system 203 can be controlled more effectively.

In the method of managing a network system in accordance with this embodiment of the present disclosure, firstly, an access request from a client is received at a network adapter, wherein the access request comprises first header information and first payload information; then, the first header information is transmitted to a load balancing server associated with the network adapter; subsequently, updated first header information is received from the load balancing server, wherein the updated first header information is determined by the load balancing server based on the received first header information and an identifier of the load balancing server, and the updated first header information indicates a destination server to which the access request is to be transmitted; and, an updated access request is generated based on the updated first header information and the first payload information.

Based on the solutions provided by this embodiment of the present disclosure, the efficiency of the load balancing operation can be effectively enhanced by obtaining and temporarily storing, at the network adapter, the payload in the access request rather than transmitting the payload to the load balancing server, thus the performance of the network system can be improved.

This embodiment utilizes some advantages of the smart NIC 207. In this embodiment of the present disclosure, in the NIC 207, the access request is decomposed into header information and payload information; and, the NIC 207 unloads and temporarily stores the payload information, transmits only the simplified access request (i.e., only the header information reserved) to the load balancing server 204, and executes the processing similar to the conventional load balancing operation. The subsequent process of forwarding the access request to a particular application server 202 needs to be performed by the NIC 207. In this case, the NIC 207 will recombine the temporarily stored payload information with the updated header information to form an updated access request and then transmit the updated access request to a particular application server 202. Similarly, for a response from the particular application server 202, the similar processing will also be executed until the response is forwarded to the corresponding client 201. The load balancing performed in the network architecture 200 will be described below in detail with reference to FIGS. 2 and 3.

Figure 3:
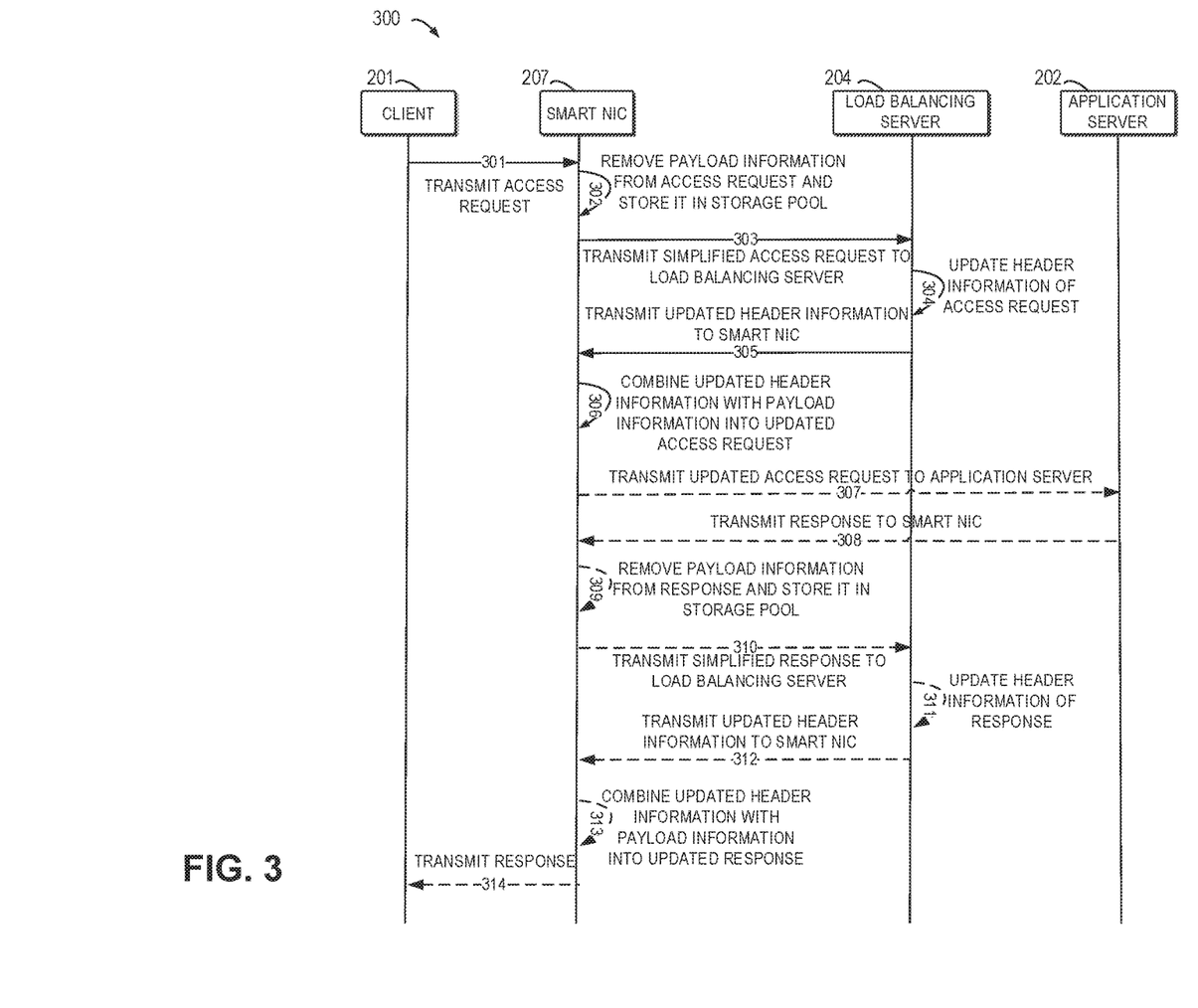
FIG. 3 illustrates a schematic diagram of interaction among components in the network architecture according to some embodiments of the present disclosure.

FIG. 3 illustrates a schematic diagram of interaction among the components in the network architecture 200 according to some embodiments of the present disclosure. It should be understood that the term "host CPU" used herein can be used interchangeably with the term "load balancing server".

First, the client 201 transmits 301 an access request to the smart NIC 207 of the network system 203. The access request has a client identifier which uniquely identifies this request. In an example, the client identifier may include the network address (e.g., IP address) of this client. It should be understood that, in other examples, the client identifier may further contain port information, request ID or other contents. The present disclosure is not limited to this.

The NIC 207 receives the access request, removes 302, based on a dynamic offloading policy preset inside the NIC 207, the payload information contained in the access request and stores the payload information in a payload information storage pool 208 inside the NIC 207. The payload information is stored together with an index value for uniquely identifying this information. The index value can be used during the subsequent retrieval of the payload information. It should be understood that the NIC 207 continuously receives access requests from a plurality of external clients 201 at every moment, removes respective payload information from each access request and temporarily stores the payload information locally (i.e., the payload information storage pool 208). Inside the NIC 207, there is also a payload index table 209. Inside the payload index table 209, there are three fields, i.e., {payload index value, client identifier, load balancing server identifier}. The index value of the payload information previously removed, together with the client identifier contained in the header information of this access request, are filled in the first two fields in the payload index table 209.

In some embodiments, after the payload information is removed from the access request, the following operation will be performed in order to maintain the integrity of the network protocol: setting, by a packet regenerator module 211 in the NIC 207, a field indicating the size of the payload data in the header information of each packet as 0. In this way, the integrity of the network protocol may be maintained. Thus, the additional CPU processing burden resulted from the change in the format of the data packets can be avoided. A regenerated simplified access request (the access request now only contains the header information) is then transmitted 303 to the load balancing server 204. In some examples, a link 212 connecting the NIC 207 and the load balancing server 204 can be a PCIe high speed data transmission bus. It should be readily appreciated that other data transmission links known to those of ordinary skill in the art can also be used to transmit access requests. The present disclosure is not limited to this.

Upon receiving the simplified access request, the load balancing server 204 obtains, from the simplified access request, the client identifier in the header information and then updates 304 the header information by the load balancing server identifier. Specifically, based on the way similar to the load balancing process described with reference to FIG. 1, the client identifier in the header information can be replaced with the load balancing server identifier which uniquely identifies the load balancing server 204. In addition, the load balancing server 204 further determines, based on a preset load balancing algorithm and for this access request, a particular application server 202 to which this access request is to be forwarded. It should be readily appreciated that the load balancing algorithm used by the load balancing server 204 can be a common load balancing algorithm for those of ordinary skill in the art. The present disclosure is not limited to this.

It is to be noted that, after the header information in the access request is updated, a correspondence between the load balancing server identifier and the client identifier is also stored in the load balancing server 204 for further use. In addition, the correspondence is also transmitted to a host-NIC communicator 210 in the NIC 207 via a link 213 (also referred to as a host-NIC communication link), which is different from the link 212. In the NIC 207, the load balancing server identifier corresponding to the client identifier is filled in the payload index table 209 based on the client identifier, in order to generate a complete record of (payload index value, client identifier, load balancing server identifier).

Subsequently, the updated header information is transmitted 305 back to the smart NIC 207. Upon receiving the updated header information, the smart NIC 207 retrieves, from the stored payload index table 209 and based on the load balancing server identifier in the smart NIC, a corresponding payload index value and then determines, from a set of payload information stored in the payload information storage pool 208 and based on the payload index value, a payload corresponding to the access request. The packet regenerator module 211 of the NIC 207 may reattach the payload information to the updated header information based on the determined payload corresponding to the updated header information, then recombine 306 the both into an updated access request, and then transmit 307 the updated access request to the particular application server determined by the load balancing server.

After the access request is forwarded to the application server 202, the payload in payload information storage pool 208, which is retrieved previously, will be released, and the payload index value corresponding to the payload will also be cleared. However, the information in the other two fields (i.e., the client identifier and the load balancing server identifier) among the three associated fields stored in the payload index table 209 in the NIC 207 will still be stored. It should be readily appreciated that the correspondence between the client identifier and the load balancing server identifier will also be stored in the load balancing server 204.

In this way, the access request from the client 201 is successfully transmitted to a particular application server 202 that receives this access request, by the processing of the smart NIC and the load balancing server. Compared with the conventional way of load balancing, with the load balancing solution in accordance with an embodiment of the present disclosure, the smart NIC 207 may temporarily store the payload information, which is contained in the access request, in the smart NIC 207, and then transmit the access request merely containing header information to the load balancing server 204 for processing. Such payload information often has a large data size. However, the load balancing executed by the load balancing server 204 actually does not need to acquire the payload information in the access information. Therefore, the time required for transmitting the payload information from the smart NIC 207 to the load balancing server 204 and then for transmitting it from the load balancing server 204 to the smart NIC 207 can be saved effectively, and thus, the CPU resources required are saved, and the processing performance of the load balancing server is effectively improved. This is especially useful when the load balancing server is confronted with a large number of concurrent access requests.

Back to FIG. 3, according to embodiments of the present disclosure, upon receiving the updated access request transmitted by the smart NIC 207, the application server 202 processes the access request and transmits 308 the response to the access request to the smart NIC 207. It should be understood that the smart NIC 207 and the load balancing server 204 will perform, through a process similar to the load balancing process performed for the access request, processing on the response.

First, the NIC 207 receives the access request, removes 309 the payload information contained in the response based on a preset dynamic offloading policy, and stores the payload information in the payload information storage pool 208 in the NIC 207. The payload information in the response is also stored together with a unique index value. The index value can be used during the subsequent retrieval of the payload information. It should be understood that the header information in the response contains a load balancing server identifier. The data item {payload index value, client identifier, load balancing server identifier} in the payload index table 209 is updated based on the load balancing server identifier, and the index value of the payload information just removed is filled in the payload index table 209.

In some embodiments, after the payload information is removed from the response, the following operation will be performed in order to maintain the integrity of the network protocol: by means of the packet regenerator module 211 in the NIC 207, setting a field in the header information of each packet which indicates the size of the payload data to be 0. In this way, the integrity of the network protocol is maintained. A regenerated simplified response (in this case, the response contains only header information) is then transmitted 310 to the load balancing server 204. In some examples, a link 212 connecting the NIC 207 and the load balancing server 204 can be a PCIe high speed data transmission bus. It should be readily appreciated that other data transmission links known to those of ordinary skill in the art can also be used to transmit the response. The present disclosure is not limited to this.

Upon receiving the modified response, the load balancing server 204 obtains the load balancing server identifier in the header information from the modified response, and further updates 311 the header information of the response. Specifically, based on the way similar to the load balancing described with reference to FIG. 1, a client identifier corresponding to the load balancing server identifier may be determined according to the correspondence stored in the load balancing server 204, and the load balancing server identifier in the header information is replaced with the client identifier.

Subsequently, the updated header information is transmitted 312 back to the smart NIC 207. Upon receiving the updated header information, the smart NIC 207 retrieves, from the stored payload index table 209 and based on the client identifier in the smart NIC, a corresponding payload index value and then determines, from a set of payload information stored in the payload information storage pool 208 and based on the payload index value, a payload corresponding to the response. The packet regenerator module 211 of the NIC 207 can reattach the payload information to the updated header information based on the determined payload corresponding to the updated header information, then recombine 313 the both into an updated response, and then transmit 314 the updated response to a particular client 201. Thus, the client, which previously transmits the access request, receives the response to this access request.

After the response is forwarded to the client 201, the payload in the payload information storage pool 208, which is previously retrieved, will be released, and the payload index value corresponding to the payload will also be cleared. Meanwhile, in the payload index table 209 in the NIC 207, the other two fields stored associated with the payload index value will also be released.

It can be seen that, by performing a process of temporarily storing the payload at the NIC 207 on the response, which is similar to the process performed on the access request, the time required for transmitting the payload can be further saved, the CPU resources required can be further saved, and the processing performance of the load balancing server can be improved more effectively.

The interactions among the components in the network architecture during the execution of load balancing operations according to embodiments of the present disclosure have been described above in detail with reference to FIGS. 2 and 3. Additional details of the method of managing a network system, which is executed at the network adapter 207, according to embodiments of the present disclosure will be described in detail hereinafter with reference to FIG. 4.

Figure 4:
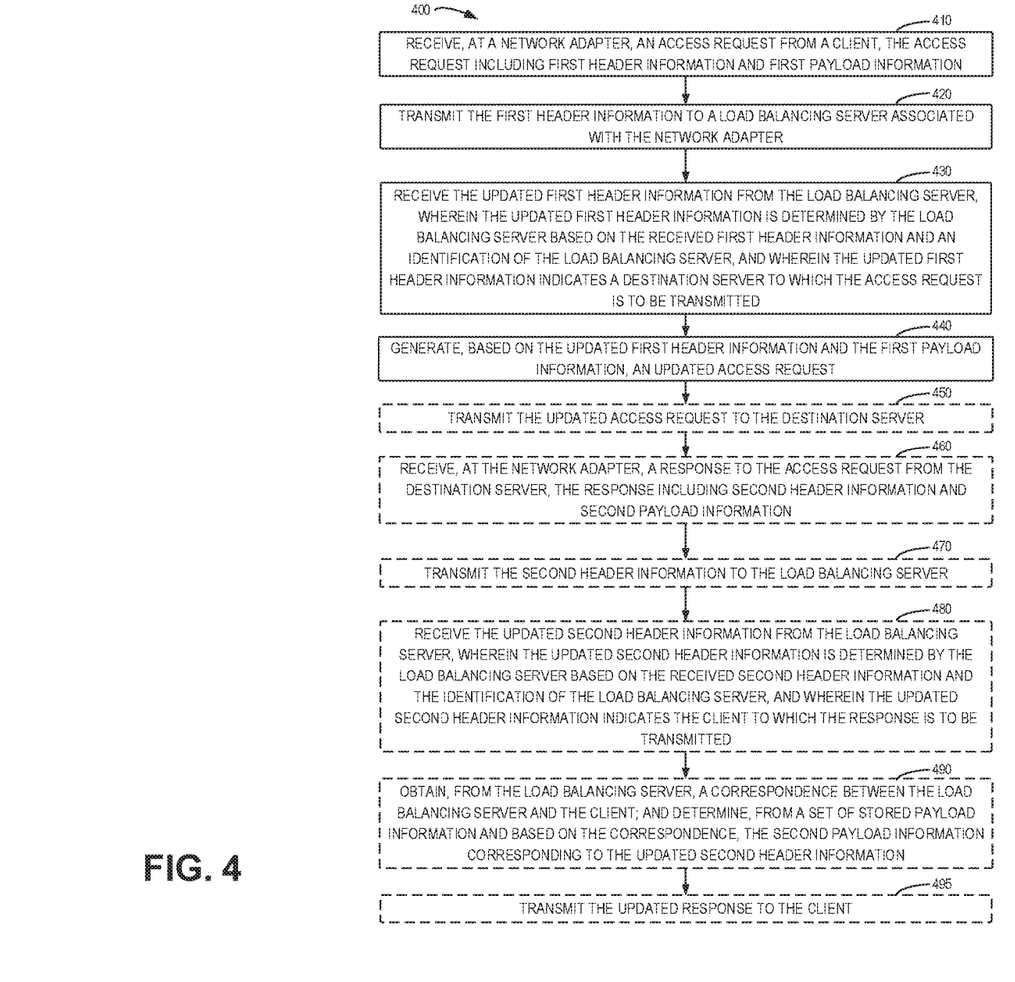
FIG. 4 illustrates a flowchart of a method of managing a network system at a network adapter according to some embodiments of the present disclosure.

FIG. 4 illustrates a flowchart of the method 400 of managing a network system according to some embodiments of the present disclosure. The steps in the method will be described hereinafter with reference to FIG. 4 in combination with FIGS. 2 and 3. The method 400 shown in FIG. 4 may be implemented at the network adapter 207, or may also be implemented by any other suitable device.

At block 410, an access request from a client is received at a network adapter 207, wherein the access request includes first header information and first payload information. It could be known from the above description that the first header information includes information for uniquely identifying a client that transmits this access request (e.g., the IP address of the client or the like), and the first payload information contains user data (for example, files, images or the like).

At block 420, the first header information is transmitted to a load balancing server 204 associated with the network adapter 207. During this process, the first payload information is removed from the access request to obtain a simplified access request, and the simplified access request is transmitted to the load balancing server 204. The removed first payload information is stored in a payload information storage pool 208 in the network adapter 207. The simplified access request contains only the first header information, and the field in the first header information which indicates the size of payload data in a packet is set to be 0, in order to ensure the integrity of the network protocol. Although the simplified access request now contains only the header information, the simplified access request is still a valid access request from the network side and thus, by the existing network protocol, can be effectively transmitted to the load balancing server 204 and processed by the load balancing server 204. Thus, the additional processing burden caused when a data packet is not in a format conforming to the network protocol can be avoided.

At block 430, the updated first header information is received from the load balancing server 204. The updated first header information is determined by the load balancing server 204 based on the received first header information. Specifically, based on the received first header information, the load balancing server replaces the client identifier in the first header information with the load balancing server identifier. It should be readily appreciated that the load balancing server 204 further determines, based on a preset load balancing algorithm and for this access request, a particular application server 202 to which this access request is to be forwarded. The information indicating the address of the application server 202 is also stored in the updated first header information.

At block 440, the NIC 207 recombines the received updated first header information and the first payload information, which is previously stored, to obtain an updated access request. During this process, the NIC 207 obtains, from the load balancing server 204, a correspondence between the load balancing server identifier and the client identifier, then determines, based on the correspondence and from the payload information storage pool 208, first payload information corresponding to the updated first header information, and recombines the updated first header information with the first payload information into an updated access request. Additionally or alternatively, at block 450, the updated access request is transmitted to the particular application server 202.

In accordance with the method 400 of managing a network system described above, by temporarily storing the payload information, unnecessary for the load balancing server 204, in the NIC 207, the time required for transmitting the access request to the load balancing server 204 and then for transmitting it from the load balancing server 204 to the smart NIC 207 can be effectively saved. Thus, the CPU resources to be occupied can be saved, and the processing performance of the load balancing server can be effectively improved. This is especially useful when the load balancing server is confronted with a large number of concurrent access requests.

Additionally or alternatively, after the access request is transmitted to the application server 202, the method 400 may further include corresponding processing for a response to the access request returned by the application server 202. This will be described hereinafter. At block 460, a response to the access request from the application server 202 is received at the network adapter. The access request contains second header information and second payload information. The second header information includes information for uniquely identifying the load balancing server (e.g., the IP address of the load balancing server or the like), and the second payload information contains user data (e.g., files, images or the like).

At block 470, the second header information is transmitted to a load balancing server 204 associated with the network adapter 207. During this process, the second payload information is removed from the response to obtain a simplified response, and the simplified response is transmitted to the load balancing server 204. The removed second payload information is stored in a payload information storage pool 208 in the network adapter 207. The simplified response contains only the second header information, and the field in the second header information which indicates the size of payload data in a packet is set to be 0, in order to ensure the integrity of the network protocol. Thus, the additional processing burden caused when a data packet is not in a format conforming to the network protocol can be avoided.

At block 480, the updated second information is received from the load balancing server 204. The updated second header information is determined by the load balancing server 204 based on the received second header information. Specifically, based on the received second header information, the load balancing server replaces the load balancing server identifier with the client identifier. It should be readily appreciated that, after the updated first header information is generated, the correspondence between the client identifier and the load balancing server identifier is still stored in the load balancing server 204.

At block 490, the NIC 207 obtains, from the load balancing server 204, the correspondence between the load balancing server identifier and the client identifier, then determines, based on the correspondence and from the payload information storage pool 208, second payload information corresponding to the updated second header information, and recombines the updated second header information with the second payload information into an updated response. Additionally or alternatively, at block 495, the updated response is transmitted to the client 201.

It can be seen that, by performing a process of temporarily storing the payload at the NIC 207 on the response, which is similar to the process performed on the access request, the time required for transmitting the payload can be further saved, the CPU resources required can be further saved, and the processing performance of the load balancing server can be improved more effectively. It should be understood that the blocks 450, 460, 470, 480, 490 and 495 are optional and exemplary, rather than restrictive.

The specific steps in the method 400 of managing a network system executed at the network adapter 207 according to some embodiments of the present disclosure have been described above. In accordance with other embodiments of the present disclosure, there is provided a method of managing a network system in the network architecture 200. More details of the method of managing a network system executed at the load balancing server 204 according to embodiments of the present disclosure will be described hereinafter in detail with reference to FIG. 5.

Figure 5:
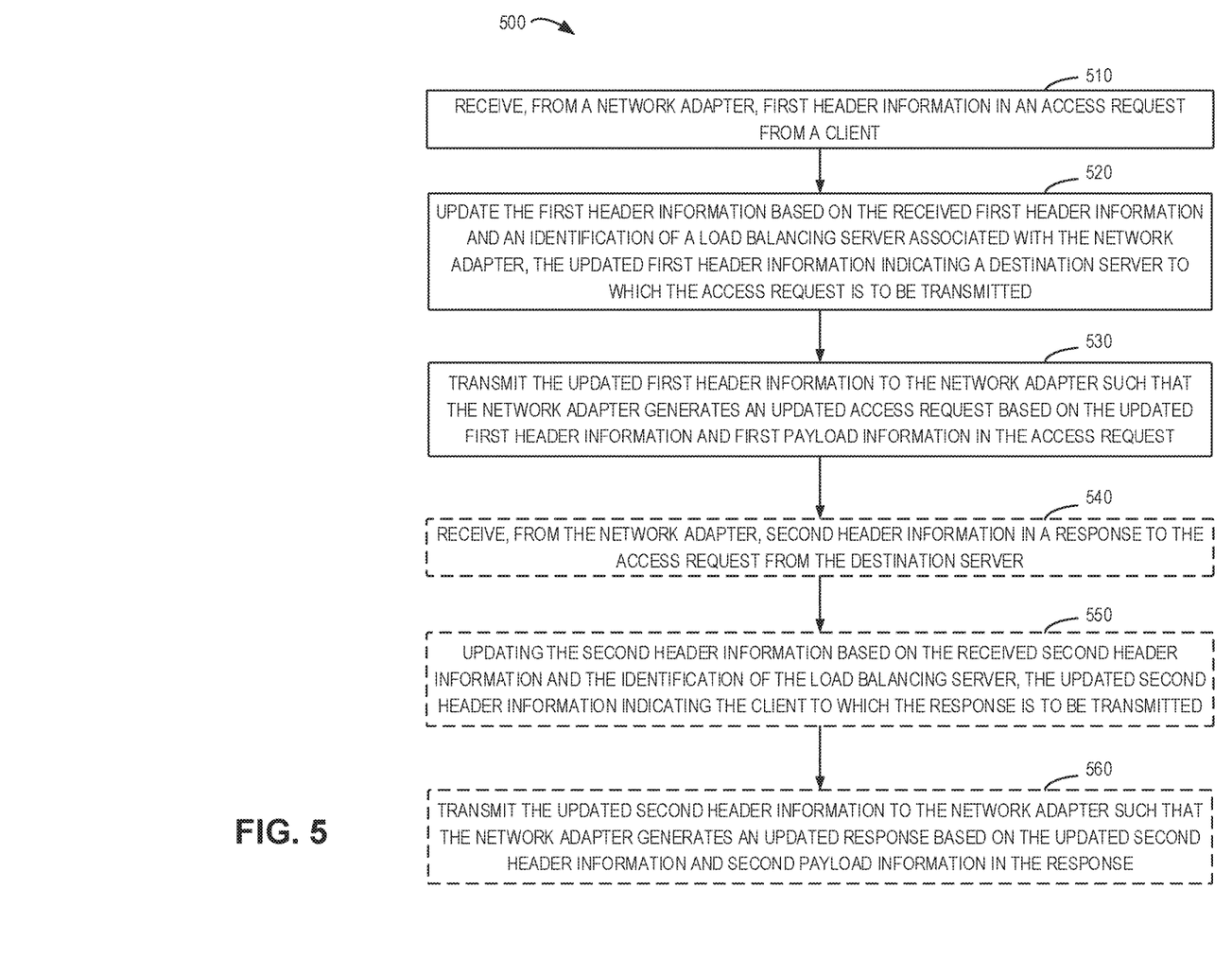
FIG. 5 illustrates a flowchart of a method of managing a network system at a load balancing server according to some embodiments of the present disclosure.

FIG. 5 illustrates a flowchart of a method of managing a network system according to some embodiments of the present disclosure. The steps in this method will be described hereinafter with reference to FIG. 5 in combination with FIGS. 2 and 3. It should be understood that the method 500 shown in FIG. 5 may be implemented at the load balancing server 204, or may also be implemented by any other suitable device. As shown in FIG. 5, at block 510, first header information in an access request from a client is received from a network adapter 207. As described above, the first header information is located in a simplified access request, and the simplified access request does not include first payload information. Before the simplified access request is transmitted to the load balancing server 204, the first payload information is removed from the access request from the client and stored in the network adapter 207.

At block 520, the updated first header information is determined based on the received first header information. The updated first header information is determined based on the received first header information by the load balancing server 204. Specifically, the load balancing server obtains, based on the received first header information, a client identifier from the first header information and replaces the client identifier in the first header information with a load balancing server identifier. It should be readily appreciated that the load balancing server 204 further determines, based on a preset load balancing algorithm and for this access request, a particular application server 202 to which this access request is to be forwarded. The information indicating the address of the application server 202 is also stored in the updated first header information.

At block 530, the updated first header information is transmitted to the network adapter 207 such that the NIC 207 recombines the received updated first header information with the previously stored first payload information into an updated access request. Prior to this process, the load balancing server 204 transmits, to the NIC 207, a correspondence between the load balancing server identifier and the client identifier; and based on that correspondence, first payload information corresponding to the updated first header information is determined from the payload information storage pool 208, and the updated first header information is recombined with the first payload information into the updated access request.

In accordance with the method 500 of managing a network system described above, by temporarily storing, in the NIC 207, payload information unnecessary for the load balancing server 204, the time required for transmitting the access request to the load balancing server 204 and then for transmitting it from the load balancing server 204 to the smart NIC 207 can be effectively saved, the CPU resources required can be saved, and the processing performance of the load balancing server can be effectively improved. This is especially useful when the load balancing server is confronted with a large number of concurrent access requests.

Additionally or alternatively, after the access request is transmitted to the application server 202, the method 500 may further include corresponding processing for a response to the access request returned by the application server 202. This will be described hereinafter.

At block 540, second header information in a response from the application server 202 is received at the network adapter 207. As described above, the second header information is in a simplified response, and the simplified response does not contain second payload information. Before the simplified access request is transmitted to the load balancing server 204, the second payload information is removed from the response from the application server 202 and stored in the network adapter 207.

At block 550, the updated second header information is determined based on the received second header information. The updated second header information is determined based on the received second header information by the load balancing server 204. Specifically, the load balancing server obtains, based on the received second header information, a load balancing server identifier from the second header information and replaces the load balancing server identifier in the second header information with a client identifier.

At block 560, the updated second header information is transmitted to the network adapter 207 such that the NIC 207 recombines the received updated second header information with the previously stored second payload information into an updated response. Prior to this process, the load balancing server 204 transmits, to the NIC 207, a correspondence between the load balancing server identifier and the client identifier; and the second payload information corresponding to the updated second header information is determined from the payload information storage pool 208 based on the correspondence, and the updated second header information is recombined with the second payload information into the updated response.

It can be seen that, by performing a process of temporarily storing the payload at the NIC 207 on the response, which is similar to the process performed on the access request, the time required for transmitting the payload can be further saved, the CPU resources required can be further saved, and the processing performance of the load balancing server can be improved more effectively. It should be understood that the blocks 540, 550 and 560 are optional and exemplary, rather than restrictive.

The methods for managing a network system respectively executed at the network adapter and the load balancing server have been described above with reference to FIGS. 4 and 5. By the methods for managing a network system according to embodiments of the present invention, the time required for transmitting the access request to the load balancing server 204 and then transmitting it from the load balancing server 204 to the smart NIC 207 can be effectively saved when the load balancing server is confronted with a large number of concurrent access requests. Thus, the CPU resources to be occupied are saved, and the processing performance of the load balancing server is effectively improved.

Figure 6:
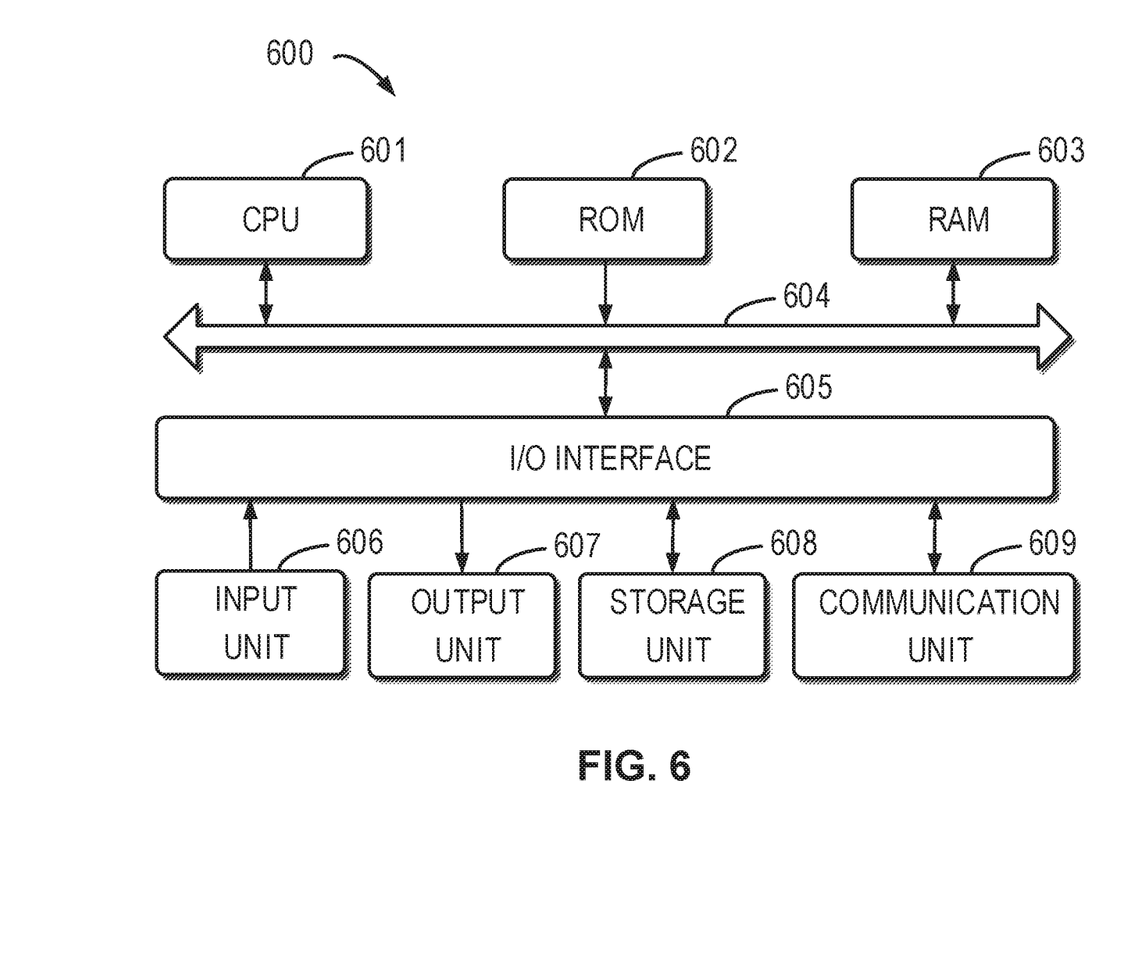
FIG. 6 illustrates a block diagram of device of managing a network system in a network architecture according to some embodiments of the present disclosure.

FIG. 6 illustrates a schematic diagram of a device of managing a network system in a network architecture according to some embodiments of the present disclosure. As illustrated in FIG. 6, the device 600 comprises a Central Processing Unit (CPU) 601 which executes various suitable actions and processing based on a computer program instruction stored in a Read-Only Memory (ROM) 602 or a computer program instruction loaded from a storage unit 608 to a Random-Access Memory (RAM) 603. The RAM 603 may further store therein a variety of programs and data required for operations of the device 600. CPU 601, ROM 602 and RAM 603 are connected via a bus 604 with one another. An input/output (I/O) interface 605 is also connected to the bus 604.

The following components in the device 600 are connected to the I/O interface 605: an input unit 606 such as a keyboard, a mouse or the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various telecommunications networks.

Various processes and methods described above, e.g., the method 400 or 500, may be executed by the processing unit 601. For example, in some embodiments, the method 400 or 500 may be implemented as a computer software program tangibly included in a machine-readable medium, e.g., the storage unit 608. In some embodiments, the computer programs may be partially or fully loaded and/or mounted onto the device 600 via the ROM 602 and/or communication unit 609. When the computer program is loaded to the RAM 603 and executed by the CPU 601, one or more steps of the method 400 or 500 described above may be executed. Alternatively, in other embodiments, the CPU 601 can be configured in other appropriate manners to implement the above process/method.

The present disclosure may be a method, a device, a system, and/or a computer program product. The computer program product may include a computer-readable storage medium having computer-readable program instructions thereon for carrying out aspects of the present disclosure.

The computer-readable storage medium may be a tangible apparatus that retains and stores instructions used by an instruction execution apparatus. The computer-readable storage medium may be, for example, but is not limited to, an electronic storage apparatus, a magnetic storage apparatus, an optical storage apparatus, an electromagnetic storage apparatus, a semiconductor storage apparatus, or any suitable combination thereof. A non-exhaustive list of more specific examples of the computer-readable storage medium comprises: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer-readable program instructions from the network and forwards the computer readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and the traditional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving the remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart and/or block diagrams of methods, devices (systems), and computer program products according to embodiments of the present disclosure. It will be understood that each block of the flowchart and/or block diagrams, and combinations of blocks in the flowchart and/or block diagrams, can be implemented by computer-readable program instructions.

These computer-readable program instructions may be provided to a processing unit of a general purpose computer, special purpose computer, or other programmable data processing device to produce a machine, such that the instructions, when executed via the processing unit of the computer or other programmable data processing device, create means for implementing the functions/acts specified in one or more blocks in the flowchart and/or block diagram. These computer-readable program instructions may also be stored in a computer-readable storage medium that can direct a computer, a programmable data processing device, and/or other apparatus to function in a particular manner, such that the computer-readable storage medium having instructions stored therein includes an article of manufacture including instructions which implement aspects of the function/act specified in the block or blocks of in the flowchart and/or the block diagram.

The computer-readable program instructions may also be loaded onto a computer, other programmable data processing devices, or other apparatus to cause a series of operational steps to be performed on the computer, other programmable devices or other apparatus to produce a computer implemented process, such that the instructions which are executed on the computer, other programmable devices, or other apparatus implement the functions/acts specified in one or more blocks in the flowchart and/or block diagram.

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions indicated in the block may also occur in a different order than that indicated in the drawings. For example, two blocks in succession may, in fact, be executed substantially in parallel, or the blocks may sometimes be executed in a reversed order, depending upon the functionality involved. It will also be noted that each block of the block diagrams and/or the flowchart, and combinations of blocks in the block diagrams and/or the flowchart, can be implemented by special purpose hardware-based systems that perform the specified functions or acts, or combinations of special purpose hardware and computer instructions.

The descriptions of the various embodiments of the present disclosure have been presented for illustrative purpose, but are not intended to be exhaustive or limited to the disclosed embodiments. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a network system, comprising:
receiving, at a network adapter, an access request from a client, the access request including first header information and first payload information;
transmitting the first header information to a load balancing server associated with the network adapter;
receiving updated first header information from the load balancing server, wherein the updated first header information is determined by the load balancing server based on the received first header information and an identifier of the load balancing server, and wherein the updated first header information indicates a destination server to which the access request is to be transmitted; and
generating, based on the updated first header information and the first payload information, an updated access request;
wherein transmitting the first header information to the load balancing server comprises:
removing the first payload information from the access request to obtain a modified access request, the modified access request including the first header information and an indicator representing the removed first payload information; and
transmitting the modified access request to the load balancing server; and
wherein generating the updated access request comprises:
obtaining, from the load balancing server, a correspondence between the load balancing server and the client; and
determining, from a set of stored payload information and based on the correspondence, the first payload information corresponding to the updated first header information.

2. The method of claim 1, further comprising:
transmitting the updated access request to the destination server.

3. The method of claim 1, further comprising:
storing the first payload information in a set of payload information.

4. The method of claim 1, further comprising:
receiving, at the network adapter, a response to the access request from the destination server, the response including second header information and second payload information;
transmitting the second header information to the load balancing server;
receiving the updated second header information from the load balancing server, wherein the updated second header information is determined by the load balancing server based on the received second header information and the identifier of the load balancing server, and wherein the updated second header information indicates the client to which the response is to be transmitted; and
generating, based on the updated second header information and the second payload information, an updated response.

5. The method of claim 4, further comprising:
obtaining, from the load balancing server, a correspondence between the load balancing server and the client; and
determining, from a set of stored payload information and based on the correspondence, the second payload information corresponding to the updated second header information.

6. The method of claim 1, wherein the access request comprises a predefined format; and
wherein generating the updated access request comprises maintaining the predefined format.

7. The method of claim 6, wherein generating the updated access request comprises setting, by a packet regenerator module, the indicator, the indicator replacing the removed first payload information.

8. The method of claim 7, wherein setting the indicator includes assigning, by the packet regenerator module, a value corresponding to zero to the indicator representing removal of all data of the first payload information from the modified access request.

9. The method of claim 7, wherein the access request comprises a packet having a header field with the first header information and a payload field with the first payload information; and
wherein generating the updated access request comprises replacing the payload field with the indicator.

10. A method of managing a network system, comprising:
receiving, from a network adapter, first header information in an access request from a client, the access request comprising the first header information and first payload information;
updating the first header information based on the received first header information and an identifier of a load balancing server associated with the network adapter, the updated first header information indicating a destination server to which the access request is to be transmitted and excluding the first payload information; and
transmitting the updated first header information to the network adapter to enable the network to generate an updated access request based on the updated first header information and the first payload information in the access request.

11. The method of claim 10, further comprising:
generating a correspondence between the load balancing server and the client; and
transmitting the correspondence to the network adapter.

12. The method of claim 10, wherein updating the first header information comprises:
obtaining an identifier of the client from the first header information; and
replacing the identifier of the client with the identifier of the load balancing server.

13. The method of claim 10, further comprising:
receiving, from the network adapter, second header information in a response to the access request from the destination server;
updating the second header information based on the received second header information and the identifier of the load balancing server, the updated second header information indicating the client to which the response is to be transmitted; and
transmitting the updated second header information to the network adapter such that the network adapter generates an updated response based on the updated second header information and second payload information in the response.

14. The method of claim 13, further comprising:
obtaining a correspondence between the load balancing server and the client; and
transmitting the correspondence to the network adapter such that the network adapter determines, from a set of stored payload information and based on the correspondence, the second payload information corresponding to the updated second header information.

15. The method of claim 10, wherein transmitting the updated first header information to the network adapter is performed such that the network adapter combines the updated first header information and the first payload information to generate the updated access request.

16. A device for managing a network system, comprising:
one or more processors;
a memory coupled to at least one of the one or more processors; and
computer program instructions stored in the memory that, when executed by the at least one processor, cause the device to execute acts, the acts comprising:
receiving, at a network adapter, an access request from a client, the access request including first header information and first payload information;
transmitting the first header information to a load balancing server associated with the network adapter;

receiving the updated first header information from the load balancing server, wherein the updated first header information is determined by the load balancing server based on the received first header information and an identifier of the load balancing server, and wherein the updated first header information indicates a destination server to which the access request is to be transmitted; and generating, based on the updated first header information and the first payload information, an updated access request;

wherein transmitting the first header information to the load balancing server comprises:
removing the first payload information from the access request to obtain a modified access request, the modified access request including the first header information and an indicator representing the removed first payload information; and
transmitting the modified access request to the load balancing server; and wherein generating the updated access request comprises:
obtaining, from the load balancing server, a correspondence between the load balancing server and the client; and
determining, from a set of stored payload information and based on the correspondence, the first payload information corresponding to the updated first header information.

17. The device of claim 16, wherein the acts further comprise:
transmitting the updated access request to the destination server; and
storing the first payload information in a set of payload information.

18. The device of claim 16, wherein
generating the updated access request comprises:
obtaining, from the load balancing server, a correspondence between the load balancing server and the client; and
determining, from a set of stored payload information and based on the correspondence, the first payload information corresponding to the updated first header information.

19. The device of claim 16, wherein the acts further comprise:
receiving, at the network adapter, a response to the access request from the destination server, the response including second header information and second payload information;
transmitting the second header information to the load balancing server;
receiving the updated second header information from the load balancing server, wherein the updated second header information is determined by the load balancing server based on the received second header information and the identifier of the load balancing server, and wherein the updated second header information indicates the client to which the response is to be transmitted; and
generating, based on the updated second header information and the second payload information, an updated response.

20. The device of claim 19, wherein the acts further comprise:
obtaining, from the load balancing server, a correspondence between the load balancing server and the client; and
determining, from a set of stored payload information and based on the correspondence, the second payload information corresponding to the updated second header information.

* * * * *